United States Patent [19]

Züger

[11] Patent Number: 4,897,785

[45] Date of Patent: Jan. 30, 1990

[54] SEARCH SYSTEM FOR LOCATING VALUES IN A TABLE USING ADDRESS COMPARE CIRCUIT

[75] Inventor: Stefan Züger, Baden, Switzerland

[73] Assignee: BBC Brown, Boveri & Company, Limited, Baden, Switzerland

[21] Appl. No.: 208,819

[22] Filed: Jun. 17, 1988

Related U.S. Application Data

[62] Division of Ser. No. 774,482, Sep. 10, 1985, abandoned.

[30] Foreign Application Priority Data

Sep. 12, 1984 [CH] Switzerland ........................ 4349/84

[51] Int. Cl.[4] ...................... G06F 12/04; G06F 15/40
[52] U.S. Cl. .................................. 364/200; 364/253; 364/252.4
[58] Field of Search ... 364/200 MS File, 900 MS File, 364/300, 419

[56] References Cited

U.S. PATENT DOCUMENTS

| | | | |
|---|---|---|---|
| 3,699,533 | 10/1972 | Hunter | 364/200 |
| 4,215,402 | 7/1980 | Mitchell | 364/200 |
| 4,525,780 | 6/1985 | Bratt et al. | 364/200 |
| 4,611,272 | 9/1986 | Lomet | 364/200 |
| 4,648,069 | 3/1987 | Funk et al. | 364/900 |

FOREIGN PATENT DOCUMENTS

632365 9/1982 Switzerland .

OTHER PUBLICATIONS

"Reciprocal Hashing: A Method for Generating Minimal Perfect Hashing Functions," *Communications of the ACM*, 12/81, vol. 24, No. 12, pp. 829–834.
V. Y. Lum et al., "Key-to-Address Transform Techniques: A Fundamental Performance Study on Large Existing Formatted Files", Communications of the ACM, vol. 14, No. 4, Apr. 1971, pp. 228-239.
W. D. Maurer, "An Improved Hash Code for Scutter Storage", Communications of the ACM, vol. 11, No. 1, Jan. 1968, pp. 35-38.
G. Jaeschke, "Reciprocal Hashing: A Method for Generating Minimal Perfect Hashing Functions", Communications of the ACM, 12/81, vol. 24, pp. 829-833.
J. D. Peterson, "Hashing for Disk File Storage", IBM Technical Disclosure Bulletin, vol. 21, No. 4, Sep. 1978, pp. 1669-1670.
M. Davio, "Read-Only Memory Implementation of Discrete Functions", IEEE Transactions on Computers, vol. C-29, No. 10, Oct. 1980, pp. 931-934.

*Primary Examiner*—Lawrence E. Anderson
*Attorney, Agent, or Firm*—Burns, Doane, Swecker & Mathis

[57] ABSTRACT

The retrieval of stored data by means of a search word or search key by using, a hashing method. For this purpose, the search key is resolved into a polynomial having the form of $$w = \sum_{i=0}^{K} w_i p^i \text{ with } 0 \leq w_i p, p \geq m$$

where i=control variable, k=its maximum value, $w_i$=polynomial coefficient, p=a power of 2, m=number of search keys in an address table stored in the memory (7). The search process occurs by means of a recursive hashing function having the form of $$h(w) = h_i(w) = h_{i1}(w_i) + h_{i0}(h_{i-1}(w)) \quad (\text{mod } p)$$

$$h_1(w) = h_{11}(w_1) + h_{10}(w_0)$$

using hashing function tables and address sub-tables stored in the memory. The address compared circuit, having three temporary memories for the polynomial coefficients $w_i$, a multiplexer, the memory, an adder registers, a comparator, an edge-triggered JK-type flip-flop with an AND gate connected to its output, and a control unit makes it possible to achieve an inexpensive hardware implementation of the search method.

10 Claims, 4 Drawing Sheets

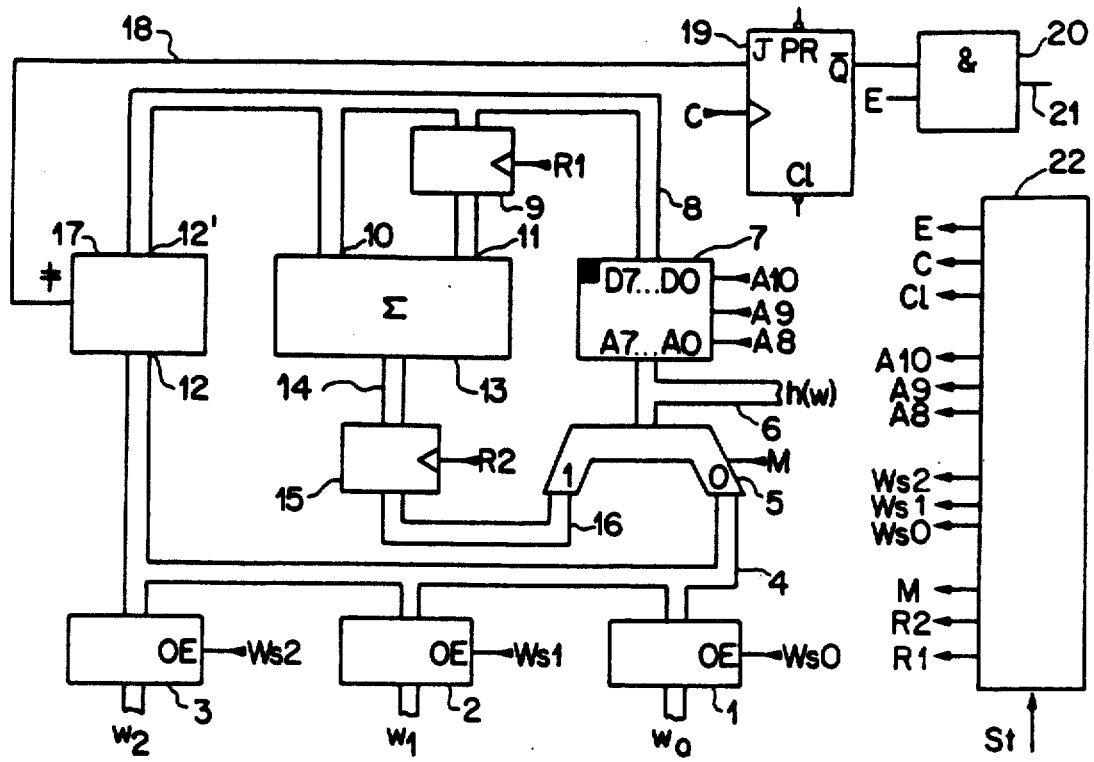
FIG.1
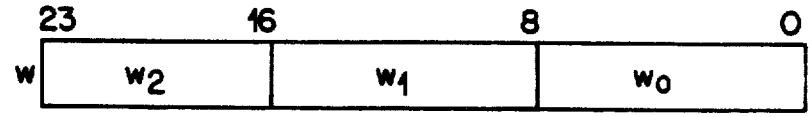
FIG.2
FIG.3

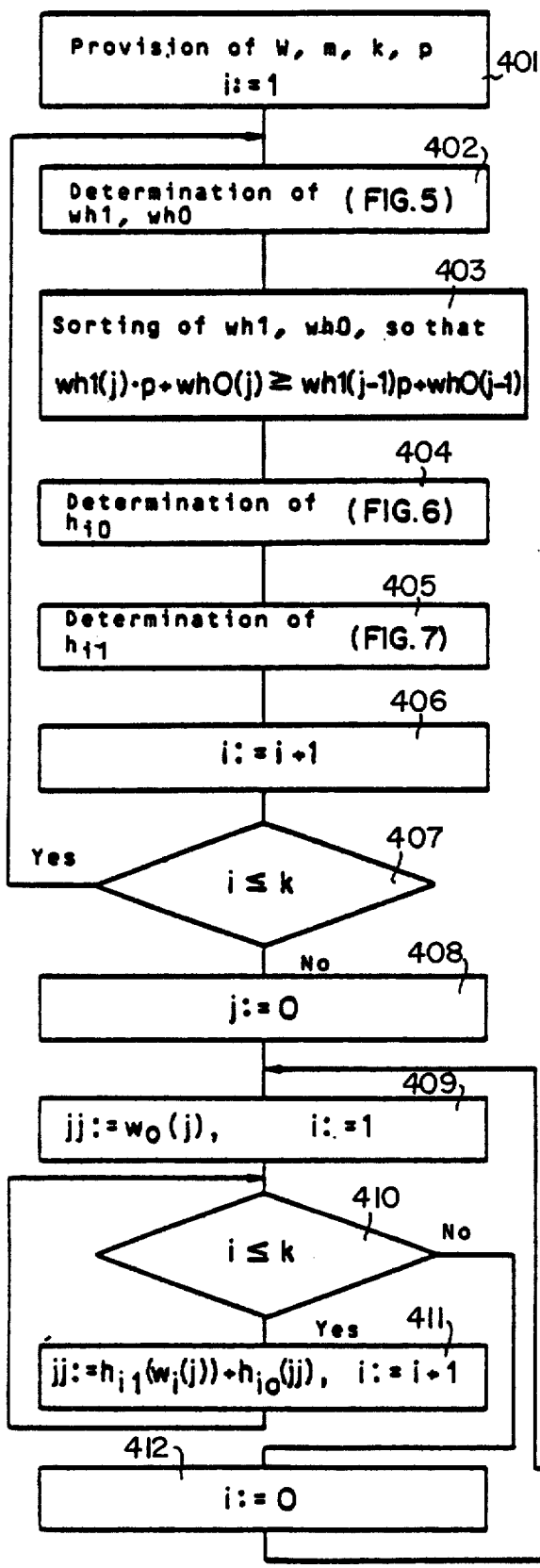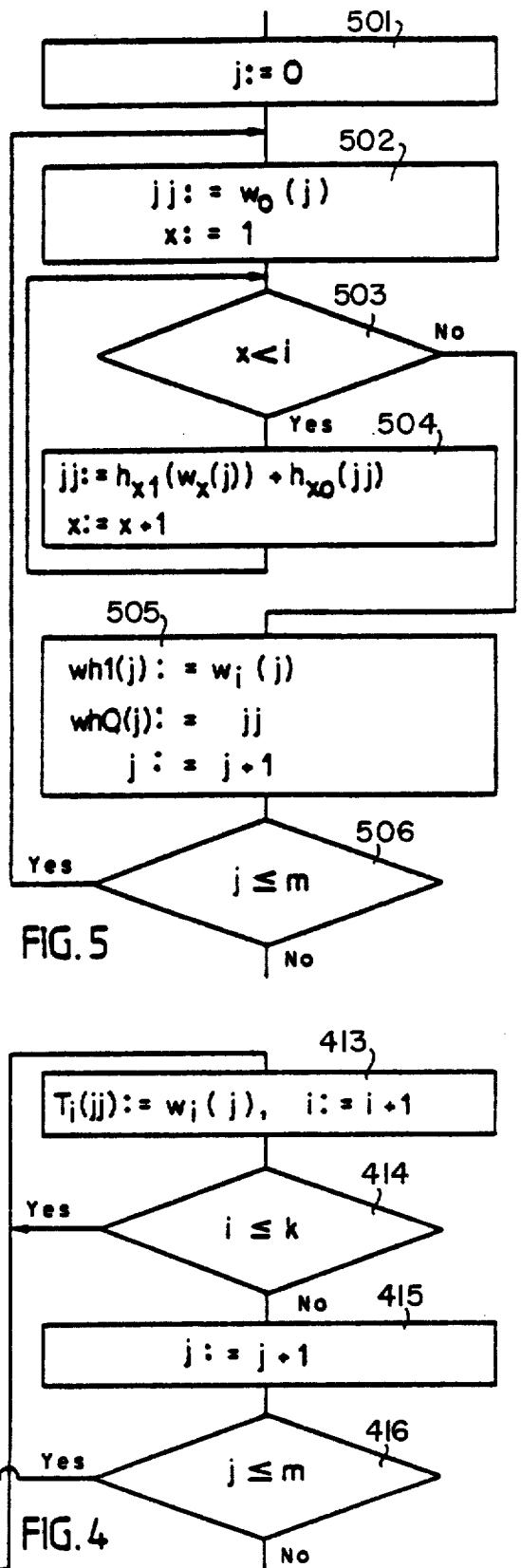
FIG. 4
FIG. 5

SEARCH SYSTEM FOR LOCATING VALUES IN A TABLE USING ADDRESS COMPARE CIRCUIT

This application is a divisional, of application Ser. No. 774,482, filed Sept. 10, 1985, now abandoned.

BACKGROUND OF THE INVENTION

The present invention relates to a search method for values or keys or memory addresses stored in an address table, and to an address compare circuit for carrying out the search method.

The recovery of stored data by means of a search word relating to these data is an important objective of information processing. A system providing the possibility of such content-related access is called associative or content addressble memory (CAM).

Conventional (semiconductor) memories are accessed on the basis of an address statement, that is to say by specifying the position of the desired data item in memory. Hitherto, only a few associative memories (CAM's) have been available as components on the market. Their memory capacity is quite small so that their use is restricted to special fields.

Larger associative memories are built up from conventional memory elements and an additional retrieval unit which implements the associative access function. The retrieval unit searches the memory contents for the predetermined key (search word). In this context, many different search strategies are conceivable which differ in implementation effort and access time. Specialized hardware or an appropriately programmed computer can be used as the retrieval unit.

The most widely used search strategies for retrieval units according to the key transformation method are the so-called variance or hashing methods. The hashing methods offer very good efficiency with low implementation expenditure. The usual hashing methods have the characteristic that the average search effort is small but that the search time exceeds the average by a multiple in the worst case. This effect makes the use of hashing methods in real-time systems considerably more difficult since the strict maintenance of time conditions must be ensured in such systems.

However, there is a class of hashing functions which do not have the above-mentioned disadvantages, which are the so-called perfect hashing functions which guarantee a uniform, very low access effort for all cases, see Communications of the ACM, Vol. 24, Dec. 1981, pages 829-833. Perfect hashing function guarantee that a key will be retrieved with a single probing, that is to say with a single access.

If W is a set of elements from interval $X = [0 \ldots n]$, n being the largest element of internal X, a perfect key transformation function or hashing function h will unambiguously map the set W in a map interval $I = [0 \ldots m]$ of integers, m being the largest element of interval I. Using h as element-to-address transformation, the elements w of the set W are stored in an address table T with a firmly predetermined number of elements m. The following applies to all elements w from the set W:

$$T(h(w)) = w.$$

That is to say, an element w is contained in the set W exactly when the value w is found at the position or at the table index $h(w)$ of the address table T. Searching for an element w in the address table T thus requires a calculation of the function h and a compare operation.

Calculating the hashing function $h(w)$ is carried out by means of hashing function tables. With an unresolved, direct arrangement of the function $h(w)$ in a memory as a hashing function table, a memory having a size of $$C_d = n \times [\log_2 m]$$

bits is needed with binary coding. $[\log_2 m]$ denotes the smallest integer greater than or equal to $\log_2 m$. With today's technology, this direct arrangement requires very elaborate memories for $n > 10^5$. In addition, storage utilization is low since in typical applications of associative memories the assumption is that $n >> m$.

The present invention relates to search methods as described in Communications of the ACM, Vol. 24 (1981), pages 829-833. In this document, two algorithms for calculating perfect hashing functions are specified which have been primarily designed for implementation in software on a high-performance computer. These functions are only conditionally suitable for implementation in hardware since their calculation requires, among other things, multiplying and dividing operations.

The implementation of discrete functions (hashing functions belong to this class) in hardware can be carried out simply and efficiently by means of function tables, see IEEE Transactions on Computers, Vol. 27 (1980), pages 931-934. These tables can be stored in large-scale integrated, inexpensive semiconductor memories.

Such search methods for memory addresses and address compare circuits can be used, for example, in a text editor where a line with a certain identifier is required, that is to say where not only the presence of an element but also its position is of interest. In distributed control and monitoring or process control systems operating in accordance with the principal of source addressing, associative receiver circuits are also needed, see, for example, Swiss Patent Specification 632,365. In this document, a data exchange method between several subscribers or partners and their processors is specified in which for useful messages to be transmitted, apart from these messages, a sender address but no receiver address is transmitted. The sender address and the data type are used by all active subscribers to decide whether the useful message is of interest to them. For this purpose, they have to compare this sender address with at least one address stored in a table.

In future high speed transmission systems, associative receiver circuits of correspondingly high performance must be used. With transmission rates of 10 MHz–100 MHz, associative memories of the order of magnitude of $100 \times 24$ bits to $5000 \times 24$ bits with an access time in the range of 1 μs to 10 μs are needed in the receivers.

SUMMARY OF THE INVENTION

The objective of specifying a search method for memory addresses and an address compare circuit which supply a faster result and provide the possibility of a more inexpensive implementation in hardware is achieved by the present invention.

One advantage of the invention consists in the fact that the operating speed of a source-addressed system can be raised by a factor of from 20 to 100. The address compare circuit can be implemented by means of a few commercially available components. The size of the hashing function table h can be reduced by splitting it into several subfunctions $h_{ij}$ so that less storage space is needed.

BRIEF DESCRIPTION OF THE DRAWINGS

The objects, advantages, and features of the present invention will become fully apparent from the following detailed description of an illustrative embodiment, when read in light of the accompanying drawings, in which:

FIG. 1 illustrates an address compare circuit including an associative memory,

FIG. 2 shows the bit allocation of the associative memory according to FIG. 1,

FIG. 3 shows a bit representation of an address in the associative memory according to FIG. 1, and FIGS. 4 to 7 are a flowchart of an algorithm for detemining a hashing function table and the address table which, together with the hashing function table, are stored in the associative memory according to FIG. 1.

DETAILED DESCRIPTION OF THE PREFERRED EMBODIMENT

Figure 6:
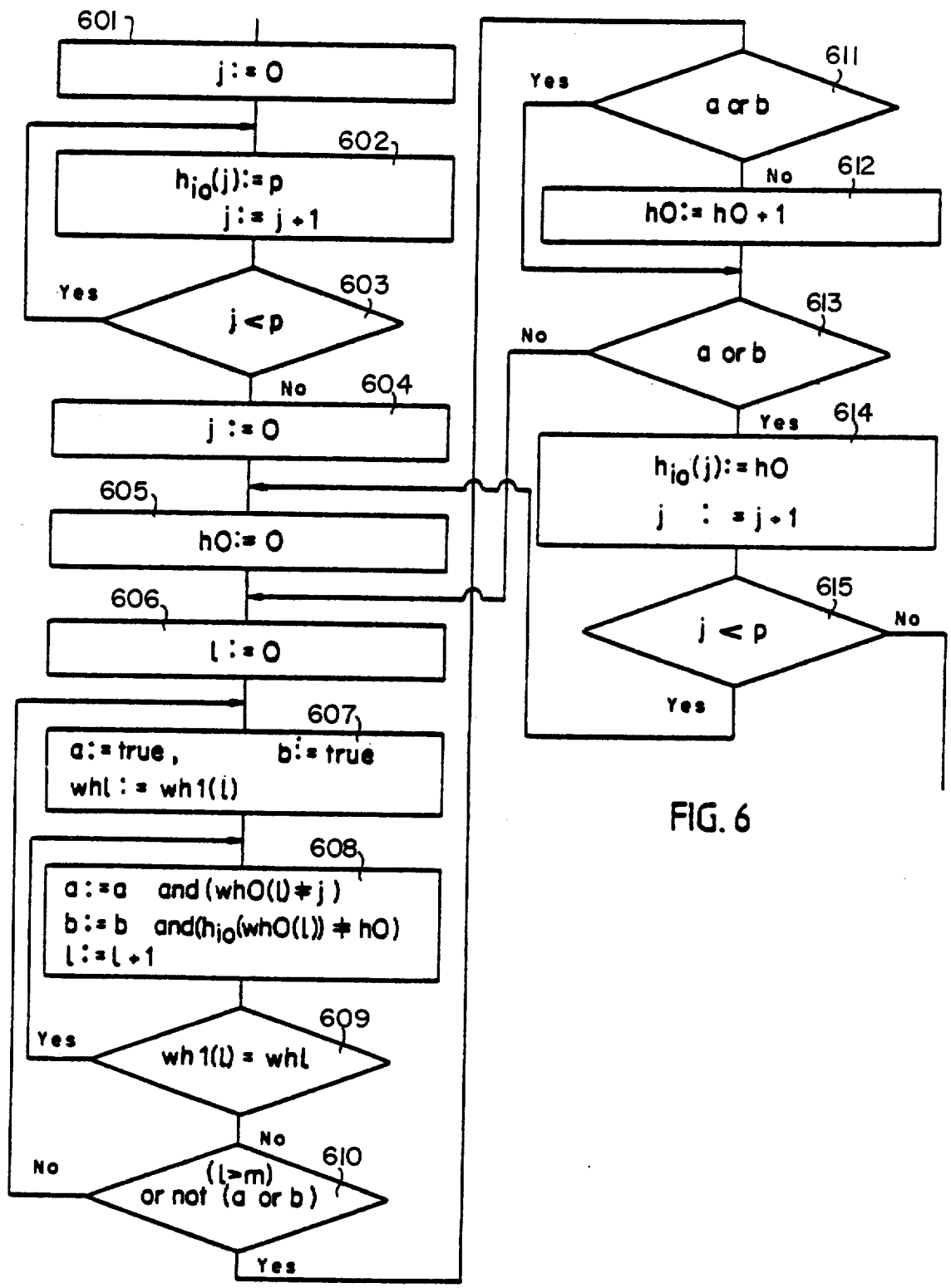

In the search method according to the invention, a key element or a search key w to be checked for the presence in an address table T, is reduced to a polynomial having the form $$w = \sum_{i=0}^{K} w_i p^i \quad 0 \le w_i < p$$

where i=control variable, k=largest value of i, $w_i$=polynomial coefficient, p=free variable. The reduction of w can be very simply implemented in digital circuits if p is selected as a power of 2.

The function h resolved into subfunctions $h_{ij}$ is defined by the recursion $$h(w) = h_k(w) = h_{k1}(w_k) + h_{k0}(h_{k-1}(w))(\text{mod } p),$$

$$h_1(w) = h_{11}(w_1) + h_{10}(w_0)(\text{mod } p).$$

For this reformulated definition of h, the condition p>must also be met.

Each subfunction $h_{ij}$ can be calculated by means of a hashing function table having a size of $$C_{ij} = p \times [\log_2 m]$$

All tables $h_{ij}$ together thus have a size of $$C_Z = 2 \times k \times p \times [\log_2 m].$$

After the resolution of h, the expenditure $C_Z$ is much less compared with the storage requirement $C_d$ for the direct implementation. For k=2, n=16777215=$2^{24}-1$ and p=256=$2^8$, for example, $$C_d = 16777215 \times [\log_2 m]$$

and $$C_Z = 4 \times 256 [\log_2 m] = 1024 [\log_2 m].$$

The recursively defined function h is calculated by the iterative algorithm $h := (h_{11}(w_1) + h_{10}(w_0)) \text{mod } p,$ for i:=2 to k do $h := (h_{i1}(w_i) + h_{i0}(h)) \text{mod } p.$ In a second step, the comparison $w = T(h(w))$ is carried out. To reduce the implementation effort, the comparison is carried out sequentially in accordance with the algorithm r:=true, for i:=0 to k do r:=r and $(w_i = T_i(h))$.

If after execution the value r is true, w is contained in the address table T at position h. If r=false, w is not contained in T.

FIG. 1 shows a circuit diagram for a hardware implementation of these algorithms. For this circuit, the parameters p=$2^8$=256, n=$2^{24}$=$256^3$ and m<256 have been selected. All circuit elements (including the signal lines or buses) have a size of 8 bits with these parameters. The circuit can be adapted without problems if other parameters are selected.

The search key w, having a length of 24 bits, is split into three parts $W_0$, $w_1$ and $w_2$ of equal length in accordance with FIG. 2. Bit positions 0 to 7 of the search key w are supplied as polynominal coefficient signal $w_0$ to the input of a temporary memory or latch 1. Bit positions 8 to 15 of w are supplied as polynomial coefficient signal $w_1$ to the input of a temporary memory or latch 2. Bit positions 16 to 23 of w are supplied as polynomial coefficient signal $w_2$ to the input of a temporary memory of latch 3. The outputs of temporary memories 1, 2 and 3 are connected via a polynomial coefficient bus 4 to a "0" input of a multiplexer 5. The temporary memory outputs are also connected, and, on the other hand to a first input 12 of a comparator 17. The temporary memories 1, 2 and 3 are controlled by output enable signals Ws0, Ws1, Ws2 which are supplied by a control unit 22. A "1" input of the multiplexer 5 is connected via a bus 16 to the output of a sum register 15.

The output of the multiplexer 5 is connected via a multiplexer output bus 6, at which the hashing function h(w) can be picked up at the end of the search method, to address A0 ... A7 of a memory 7. The multiplexer 5 can be switched over at its input via a select input M which is connected to the control unit 22.

The associative memory 7 can be controlled by the control unit 22 via control inputs A8, A9 and A10. The memory 7 is connected via address outputs D0 ... D7 and a memory output bus 8 to the input of an addend register 9, a first input 10 of an adder 13 and a second input 12' of the comparator 17. A memory in NMOS technology as described in the Intel Component Data Catalog, 1982, pages 2-1 to 2-8 can be used as memory 7.

The output of the addend register 9 is connected to a second input 11 of the adder 13. The output of the adder 13 is connected via an adder output bus 14 to the input of the sum register 15. The addend register 9 can be controlled by the control unit 22 via a clock input R1 and the sum register 15 can be controlled by the control unit 22 via a clock input R2. When a clock pulse arrives at the clock input R1 and R2, the signal present at the input of the addend register 9 and at the sum register 15 is stored in the respective register and is simultaneously available to be picked up at the output of the respective register.

The output of the comparator 17 is connected to a J input of an edge-triggered JK-type flip-flop 19 with negated clear input C1. The clear input C1 and a clock signal input C of the JK-type flip-flop 19 are connected to the control unit 22. A suitable JK-type flip-flop from the TTL family of components is known by the type designation 74 LS 109 from the book "The TTL Data Book for Design Engineers", 1976, pages 5-33 by the firm of Texas Instruments. Only half of the known chip is needed. The unneeded preset input PR must be set to a logical "1" to achieve the desired behavior. One input of an AND Gate 20 is connected to the Q output of the JK-type flip-flop 19, and the other input is connected to an end signal output E of the control unit 22. At the AND Gate output 21, a "1" signal is present only if the comparator 17 determines at the end of the compare process that its input signals are equal, that is when the search key w is stored in memory 7.

The operation of the control unit is illustrated in Table 1. Implementation is non-critical and can be carried out, for example, by means of a binary counter and a subsequent decoder for generating the individual control signals. "St" designates a start signal input of the control unit 22.

TABLE 1

| Step | R1 | R2 | M | $W_{s2}...w_{s0}$ | $A_{10}...A_8$ | FF-Clear Cl | Clock C | End E |
|---|---|---|---|---|---|---|---|---|
| 1 | 0 | 0 | 0 | 001 | 000 | X | X | 0 |
| 2 | 1 | 0 | 0 | 010 | 001 | X | X | 0 |
| 3 | 0 | 1 | 0 | 100 | 010 | X | X | 0 |
| 4 | 1 | 0 | 1 | XXX | 011 | X | X | 0 |
| 5 | 0 | 1 | 1 | 001 | 100 | 0 | X | 0 |
| 6 | 0 | 0 | 1 | 010 | 101 | 1 | | 0 |
| 7 | 0 | 0 | 1 | 100 | 110 | 1 | | 0 |
| 8 | 0 | 0 | 1 | XXX | XXX | 1 | | 1 |

In Table 1, X is an irrelevant condition, FF-clear is the clear input signal C1 of 22, clock is the clock signal C of 22 and end is the end signal E of 22. For the sake of simplicity, the same designations are used for signal and signal input or output.

The arrows in the clock column indicate that the clock signal C changes from 0 to 1 immediately at the beginning of the respective step. The storage areas in which the hashing subfunctions $h_{10}$, $h_{11}$, $h_{21}$, $h_{20}$ and the sub-tables $T_0$, $T_1$, and $T_2$ are stored in memory 7 are successively addressed by the values 000 to 110 in column $A_{10}...A_8$.

The memory organization is shown in FIG. 3. The memory is used simultaneously for the hashing function tables $h_{xy}$ and the address table T. Given the parameters selected, the memory must have a capacity of at least 1,792×8 bits; in practice a memory of 2,048×8 bits is selected.

After the search key w has been applied to the temporary memories 1 to 3 and the "start comparison" command has been applied to the start signal input St of 22, the control unit 22 executes steps 1 to 8 in accordance with Table 1. During step 8, a "1" signal at the AND gate output 21 indicates that w is contained in address table T. At the multiplexer output bus 6, the result of the calculation of the hashing function h(w), corresponding to the memory location of the address table T at which a data item identical to search key w is stored, can be picked up.

The maximum operating speed of the address compare circuit is essentially determined by the access time of the memory chip used, if standard components are used. If the multiplexer 5, the adder 13, the registers 9 and 15, the comparator 17 and the JK-type flip-flop 19 are built up of low-power Schottky TTL chips and a memory having an access time of 200 ns is used, about 2 ms are needed for an associative access. If fast components, such as advanced Schottky TTL circuits, and a memory having an access time of 50 ns are used, the time needed for an associative access can be reduced to 600 ns.

The search method of the perfect hashing and the operation of the associated address compare circuit will be explained with the following example. In table 2, a selected key set W is specified which is the starting base for calculating the tables h and T.

The hashing function table $h_{10}$, $h_{11}$, $h_{20}$, $h_{21}$ associated with the key set W according to Table 2 is reproduced in Table 3 and the address table T with address subtables $T_0$, $T_1$, $T_2$ in Table 4. For reasons of simpler representation, the number of entries in the key table has been restricted to 12 (T(0) to T(11)). The remaining elements T(12) to T(255) are not used and are set to zero. Also for reasons of simpler representation, the key set has been selected in such a manner that the entry is non-zero only for elements within a range from 0 to 24 of Tables $h_{xy}$.

FIGS. 4-7 are flowcharts of a possible algorithm for determining the Tables $h_{xy}$ and $T_x$. The algorithm has the aim of determining the contents of Tables $T_x$ and $h_{xy}$ so that the condition $$T(h(w(i))) = w(i)$$

which characterizes the perfect hashing method, is satisfied for all m elements of the predetermined key set W.

TABLE 2

| Key set W | |
|---|---|
| i | w |
| 0 | 851877 |
| 1 | 1114124 |
| 2 | 1572876 |
| 3 | 857097 |
| 4 | 726025 |
| 5 | 398336 |
| 6 | 66565 |
| 7 | 132099 |
| 8 | 984082 |
| 9 | 1117952 |
| 10 | 1245710 |
| 11 | 1379853 |

TABLE 4

| Address table T and reduction to sub-tables $T_0$, $T_1$, $T_2$ | | | | |
|---|---|---|---|---|
| i | T | $T_0$ | $T_1$ | $T_2$ |
| 0 | 66565 | 5 | 4 | 1 |
| 1 | 132099 | 3 | 4 | 2 |
| 2 | 398336 | 0 | 20 | 6 |
| 3 | 726025 | 9 | 20 | 11 |
| 4 | 851977 | 9 | 0 | 13 |
| 5 | 857097 | 9 | 20 | 13 |
| 6 | 984082 | 18 | 4 | 15 |
| 7 | 1114124 | 12 | 0 | 17 |
| 8 | 1117952 | 0 | 15 | 17 |
| 9 | 1245710 | 14 | 2 | 19 |
| 10 | 1379853 | 13 | 14 | 21 |
| 11 | 1572876 | 12 | 0 | 24 |
| 12 | 0 | 0 | 0 | 0 |

Elements 13 ... 255 of address table T are = 0

TABLE 3

| Hashing function table $h_{10}, h_{11}, h_{20}, h_{21}$ | | | | |
|---|---|---|---|---|
| i | $h_{10}$ | $h_{11}$ | $h_{20}$ | $h_{21}$ |
| 0 | 0 | 0 | 0 | 0 |
| 1 | 0 | 0 | 0 | 0 |
| 2 | 0 | 2 | 0 | 1 |
| 3 | 0 | 0 | 0 | 0 |
| 4 | 0 | 3 | 0 | 0 |
| 5 | 1 | 0 | 0 | 0 |
| 6 | 0 | 0 | 0 | 2 |
| 7 | 0 | 0 | 1 | 0 |
| 8 | 0 | 0 | 0 | 0 |
| 9 | 1 | 0 | 1 | 0 |
| 10 | 0 | 0 | 0 | 0 |
| 11 | 0 | 0 | 0 | 2 |
| 12 | 0 | 0 | 0 | 0 |
| 13 | 0 | 0 | 0 | 4 |
| 14 | 0 | 6 | 0 | 0 |
| 15 | 0 | 7 | 0 | 6 |
| 16 | 0 | 0 | 0 | 0 |
| 17 | 0 | 0 | 0 | 7 |
| 18 | 2 | 0 | 0 | 0 |
| 19 | 0 | 0 | 0 | 9 |
| 20 | 0 | 8 | 0 | 0 |
| 21 | 0 | 0 | 0 | 10 |
| 22 | 0 | 0 | 0 | 0 |
| 23 | 0 | 0 | 0 | 0 |
| 24 | 0 | 0 | 0 | 11 |

Elements 25 ... 255 of all function tables $h_{xy}$ are = 0

FIG. 4 gives an overview of the sequence of a calculation. The key set W with sections or polynomial coefficients $w_0$, $w_1$ and $w_2$ according to FIG. 2, the number of elements m of the set W and the parameters p and k of the hardware circuit used are predetermined (block 401). The program iteratively calculates Table $h_{i1}$ and $h_{i0}$ for i from 1 to k (blocks 403–407). For the calculation, auxiliary tables wh1 and wh0 are set up which contain the corresponding section of W in a suitable form (FIG. 5).

FIG. 5 shows the calculation of wh0 and wh1 (blocks 501–506). The values of wh0 are calculated from the previously determined section of hashing function $h_i(w)$ (blocks 503–504); $w_i$ is copied in Wh1 (block 505). Referring again to FIG. 4, in a next step (block 403), the auxiliary tables wh1 and wh0 are sorted so that the following applies:

$$wh1(j) \times p + wh0(j) \geq wh1(j-1) \times p + wh0(j-1),$$
$$1 \leq j \leq m.$$

The sorting process is not shown in detail; reference is made to the appropriate literature (for example, N. Wirth, Algorithmen und Datenstrukturen, (Algorithms and Data Structures), Teubner 1979).

Quantities h0, h1, wh0 and wh1 are only used as auxiliary functions in calculating the tables $h_{xy}$; they do not occur at other places and particularly not in the hardware circuit.

FIG. 6 shows the calculation of Table $h_{i0}$ (blocks 601–615). Initially, all table values are initialized with p beginning with the first entry (Position 0) (blocks 601–603), the individual values are sequentially determined. For determining each table value $h_{i0}(j)$, the possible values, starting from 0, (the current value in each case is represented by h0) are sequentially examined for conflicts with the previously established table values of ($h_{i0}$ (0 ... j−1)) (blocks 604–610). A conflict occurs if the inequation $$(h_{i0}(wh0(x)) \neq h_{i0}(wh0(y)))$$

or $$(wh1(x) \neq wh1(y)), x \neq y$$

is not satisfied. For the test for conflicts, the order of Tables wh1 and wh0 is utilized and it can be assumed that all elements having the same value wh1(j) are directly behind each other. In the case of a conflict, h0 is incremented by one (block 612) and again tested for all m entries of wh1 and wh0. If no conflict occurs, the value found is entered in Table $h_{i0}$ at position j (block 614).

Figure 7:
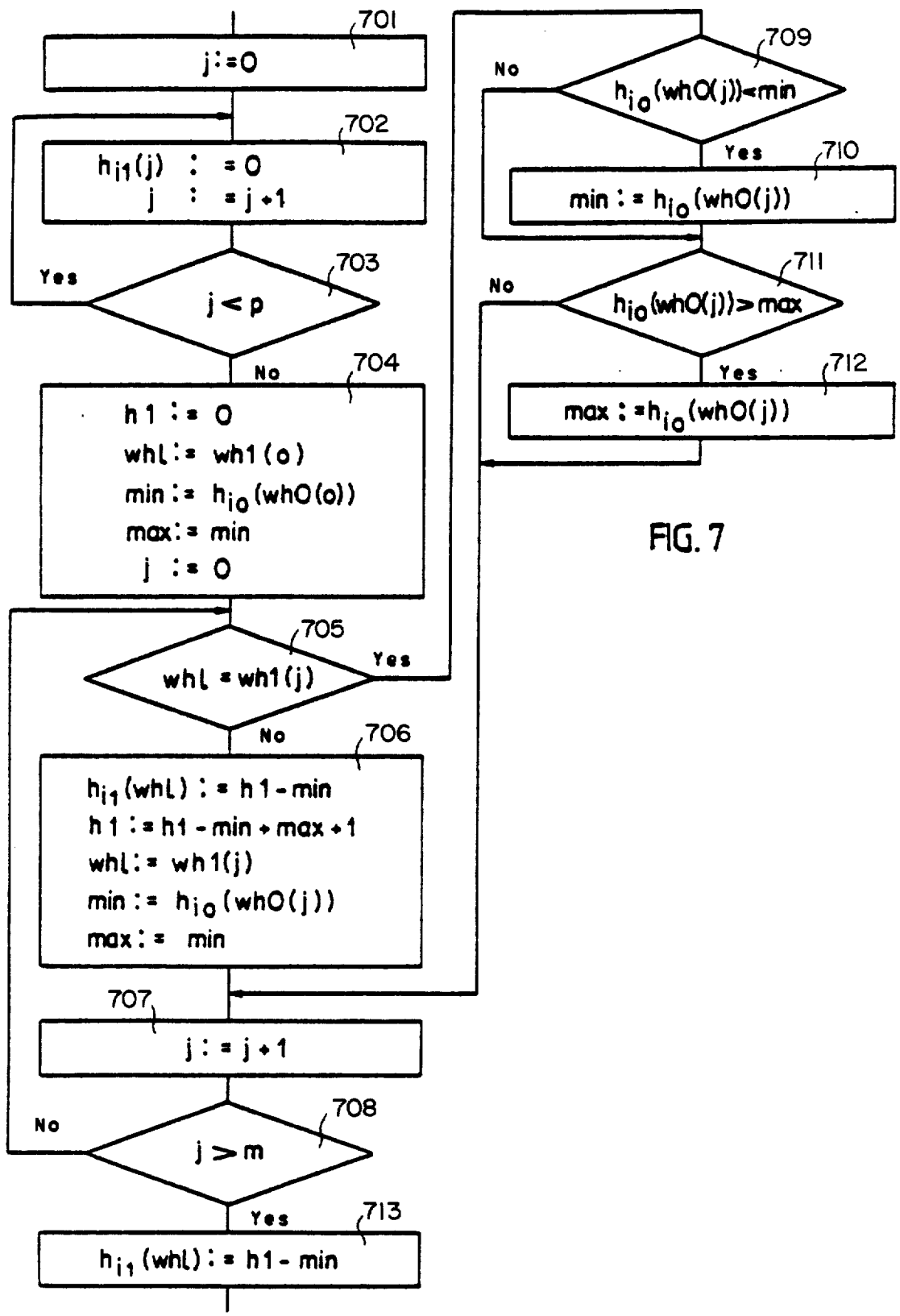

Tables $h_{i1}$ are determined in accordance with the flow chart of FIG. 7. First the Table is initialized with 0 (blocks 701–704). The individual values $h_{i1}$ (wh1(j)) are sequentially determined for the individual elements. For this purpose, the ordered structure of wh1, wh0 is utilized. For all wh1(x) having the same value in each case, which directly follow each other due to the order, the minimum and maximum of the corresponding values $h_{i0}(wh0(x))$ is determined (variables min and max, respectively) (blocks 705–712). The corresponding Table entry is calculated (block 713) in accordance with $$h_{i1}(wh1(j)) = h1 - \min.$$

h1=0 for j=0 and for other cases h1 is set to $$h1 = h_{i1}(wh1(j)) - \min + \max 1$$

according to the allocation of the Table value.

The Tables $T_x$ are calculated in accordance with the initial equation for the perfect hashing method:

$$T(h(w(i))) = w(i).$$

The individual sub-tables $T_x$ are determined in accordance with the lower part of the flow chart of FIG. 4 from j:=0. The equation $$T_j(h(w(i))) = )w_j(i)$$

is evaluated for j=0 ... k for all m elements.

EXAMPLE 1

Input of search key w: 851977
resolving w into $w_0 ... w_2$: $w_0=9$, $w_1=0$, $w_2=13$
Calculating the hashing function h(w):

Step 1, see Table 1: as Ws0=1, the polynomial coefficient signal $w_0=9$ passes from the temporary memory 1 via the polynomial coefficient bus 4 via the multiplexor 5 in the "0" position and the multiplexor output bus 6 to the address inputs A0 ... A7 of memory 7. Due to the 000 signal at the control inputs A8, A9 and A10, the signal $h_{10}(w_0)=h_{10}(9)=1$, see Table 3, appears at the address outputs D0 ... D7 of the memory 7.

Step 2: At the clock input R1 of the addend register 9 a "1" signal is present which causes the signal $h_{10}^{(9)}=1$ present at its input to be stored. $h_{10}^{(9)}=1$ is now also present at the second input 11 of 13. As Ws1=1, the polynomial coefficient signal $w_1=0$ passes from the temporary memory 2 via the bus 4, the multiplexor 5 and the bus 6 to the address inputs A0 ... A7 of the memory 7. Due to the 001 control signal at A8 . . A10, the signal $h_{11}(w_1) = h_{11}^{(0)} = 0$ appears at the address outputs D0 ... D7 of 7. At the output of the adder 13, the signal $h_1(w) = h_{11}(w_1) + h_{10}(w_0) = 0 + 1 = 1$ appears.

Step 3: At the clock input R2 of the sum register 15, a "1" signal is present which causes the signal $h_1(w)=1$ present at its input to be stored which causes this signal to be available at the output at 15. As Ws2=1, the polynomial coefficient signal $w_2=13$ passes from the temporary memory via the bus 4, the multiplexor 5 and the bus 6 to the address inputs A0 . . . A7 of the memory 7. Due to the 010 control signal at A8, A9, A10, the signal $h_{21}(w_2)=h_{21}(13)=4$, see Table 3, appears at the address outputs D0 . . . D7 of 7.

Step 4: As R1="1", $h_{21}(w_2)=4$ is stored in the Addend register 9 which causes its value to be present at the second input 11 of the Adder 13. As M="1", the output signal $h_1(w)=1$ of the sum register 15 passes via the bus 16, the multiplexor 5 and the bus 6 to the address inputs A0 . . . A7 of the memory 7. Due to the 010 control signal at A8, A9, A10, the signal $h_{20}(h_1)=h_{20}(h_{11}=h_{10})=h_{20}(1)=0$, see Table 3, appears at the address outputs D0 . . . D7 of 7. At the output of the adder 13, the quantity $h(w)=h_{21}(w_2)+h_{20}(h_1)=4+1=4$ appears.

Comparing $T(h(w))=w$:

Step 5: The JK-type flip-flop 19 is cleared or reset with the C1="0" signal. As R2="1", h(w)=4 is stored in the sum register 15 and made available at the output at 15. As M="1", h(w)=4 appears at the address inputs A0 . . . A7 of the memory 7. Due to the 100 control signal at A8, A9, A10, the signal $T_0(4)=9$ is present at the address outputs D0 . . . D7 of 7, at the bus 8 and at the second input 12' of the comparator 17. Since Ws0="1", the polynomial coefficient signal $w_0=9$ is present via the temporary memory 1 and the bus 4 at the first input 12 of the comparator 17 and a "0" signal, corresponding to "equality" of the signals to be compared is present at the negated output of 17, at the comparator output signal line 18 and at the J input of the JK-type flip-flop 19.

Step 6: With the clock signal C at a high level at the JK-type flip flop 19, the $\overline{Q}$ output of 19 is set to "1" due to the "0" signal at its J input. As R2="0" and M="1", the signal h(w)=4 is still present at the output of the multiplexer 5. Due to the 101 control signal at A8 . . . A10, the signal $T_1(4)=0$, see Table 3, appears at the address outputs D0 . . . D7 of the memory 7 and at the second input 12' of the comparator 17. Since Ws1="1", the polynomial coefficient signal $w_1=0$ is present via the temporary memory 2 and the bus 4 at the first input 12 of the comparator 17 and a "0" signal, corresponding to "equality" of the signals to be compared, is present at the output of 17.

Step 7: With Cl="1" and C=" ↑ ", the $\overline{Q}$ output signal of the JK-type flip-flop 19 remains unchanged at "1". As R2="0" and M="1", the signal h(w)=4 is present unchanged at the address input A0 . . . A7 of the memory 7. Due to the 110 control signal at A8 . . . A10, the signal $T_2(4)=13$, see Table 3, appears at the address outputs D0 . . . D7 of the memory 7 and at the second input 12' of the comparator 17. Since Ws2="1", the polynomial coefficient signal $w_2=13$ is present via the temporary memory 3 and the bus 4 at the first input 12 of the comparator 17 and a "0" signal, corresponding to "equality", is present at the output of 17.

Result:

Step 8: With Cl="1" and C=" ↑ ", the $\overline{Q}$ output signal of the JK-type flip-flop 19 remains unchanged at "1". Due to the end signal E="1", a valid signal "1", having the significance that the search key 2 is present in the address table T of the memory 7, appears at output 21 of the AND gate 20. As R2="0" and M="1", the signal h(w)=4, which marks the position in the address table T, is present unchanged at the multiplexer output bus 6. The address table T is represented by the address sub-tables $T_0$, $T_1$ and $T_2$ in the memory 7. Address table T is formed by $T_0$, $T_1$ and $T_2$ in the same manner as the search key w is represented by $w_0$, $w_1$ and $w_2$, see FIG. 2.

EXAMPLE 2

Input of search key w: 398336
Resolving w into $w_0 \ldots w_2$: $w_0=0$, $W_1=20$, $w_2=6$
Calculating the hashing function h(w):

| | |
|---|---|
| $h_{10}(w_0) =$ | $h_{10}(0) = 0$ |
| $h_{11}(w_1) =$ | $h_{11}(20) = 8$ |
| $h_{21}(w_2) =$ | $h_{21}(6) = 2$ |
| $h_{20}(h_{11} + h_{10}) =$ | $h_{20}(8) = 0$ |
| $h(w) = h_{21} + h_{20} =$ | 2 |

| Comparison of T(h(w)) = w: | | |
|---|---|---|
| $T_0(2) = 0$ | $T_1(2) = 20$ | $T_2(2) = 6$ |
| == | $T(h(w)) = 398336$ | |

| Result: |
|---|
| == 398336 is located at position 2 in address table 4. |

EXAMPLE 3

Input of search key w: 398345
Resolving w into $w_0 \ldots w_2$: $w_0=9$, $w_1=20$, $w_2=6$
Calculating the hashing function h(w):

| | |
|---|---|
| $h_{10}(w_0) =$ | $h_{10}(9) = 1$ |
| $h_{11}(w_1) =$ | $h_{11}(20) = 8$ |
| $h_{21}(w_2) =$ | $h_{21}(6) = 2$ |
| $h_{20}(h_{11} + h_{10}) =$ | $h_{20}(9) = 1$ |
| $h(w) = h_{21} + h_{20} =$ | 3 |

| Comparison of T(h(w)) = w: | | |
|---|---|---|
| $T_0(3) = 9$, | $T_1(3) = 20$. | $T_2(3) = 6$ |
| == | $T(h(w)) = 398345$ | |

| Result: |
|---|
| == 398345 is not in address table 4. |

What is claimed is:

1. An address compare circuit for determining whether a search key (w) is present in a memory, comprising:
   (a) a memory;
   (b) a control unit coupled with an input to said memory;
   (c) a multiplexer coupled with address inputs of said memory;
   (d) a sum register having an output coupled with a first multiplexer input;
   (e) at least one temporary memory for a search key (w) having an output coupled with a second multiplexer input;
   (f) an addend register having an input coupled with an output of said memory;
   (g) an adder having a first input coupled with said memory output and a second input coupled with said addend register, an output of said adder being coupled with said sum register;
   (h) a comparator having a first input coupled with said memory output and a second input coupled with said temporary memory output; and (i) a bistable memory unit having an input coupled with an output from said comparator.

2. The circuit of claim 1 wherein the bistable memory element is an edge-triggered JK-type flip-flop with clear input, the J input of which is effectively connected to the output of the comparator.

3. The circuit of claim 1 wherein an AND gate is provided which is effectively connected at its input to an output of the bistable memory element, and to an end signal output of the control unit and at the output of which AND gate a valid signal or an invalid signal can be picked up as function of the input signals, having the meaning that the search key (w) is present or not present, respectively, in an address table stored in the associative memory.

4. The circuit of claim 3 wherein
   (a) the at least one temporary memory, the addend register, the sum register, the bistable memory element and the multiplexer are controlled by the control element as a function of predeterminable control steps, and
   (b) at the output of the multiplexer, a table index signal h(w)) can be picked up which specifies at which position in the address table a data item equal to the search key (w) is stored.

5. The circuit of claim 1 wherein
   (a) a memory having an access time of $\leq 50$ ns is used, and
   (b) the address compare circuit includes fast AS-TTL components.

6. An address compare circuit for determining whether a search key (w) is present in a memory, comprising:
   (a) a memory;
   (b) a control unit coupled with an input to said memory;
   (c) a multiplexer coupled with address inputs of said memory;
   (d) a sum register having an output coupled with a first multilexer input;
   (e) at least one temporary memory for a search key (w) having an output coupled with a second multiplexer input;
   (f) an addend register having an input coupled with an output of said memory;
   (g) an adder having a first input coupled with said memory output and a second input coupled with said addend register, an output of said adder being coupled with said sum register;
   (h) a comparator having a first input coupled with said memory output and a second input coupled with said temporary meory output; and
   (i) a bistable memory unit having an input coupled with an output from said comparator;
   said memory comprising data items or keys in an address table (T), said address table (T) including subtables ($T_0$, $T_1$, $T_2$), each of said sub-tables containing polynomial coefficients having a control variable i, in accordance with $$T = \sum_{i=0}^{k} T_i p^i \; 0 \leq T_i < p;$$

said memory storing a hashing function table with sub-functions ($h_{ij}$) of a recursive hashing function of the form $$h(w) = h_i(w) = h_{i1}(w_i) + h_{i0}(h_{i-1}(w))(\bmod p),$$

$$h_1(w) = h_{11}(w_1) = h_{10}(w_0);$$

wherein a hashing function h(w) for each search key w is calculated with the use of said hashing function table in accordance with:

$$h := h_{11}(w_1) = h_{10}(w_0)(\bmod p),$$

for i:=2 to k, do h:=($h_{i1}(w_i) = h_{i0}(h)$) (mod p);

$$w = \sum_{i=0}^{k} w_i p^i \; 0 \leq w_i < p, \; p \geq m$$

wherein i is a control variable, k is the maximum value of the control variable i, $w_i$ is a polynomial coefficient, p is a free variable, and m is the number of keys in the address table; said search key being compared with a data item having the table index h(w) of said address table.

7. The circuit of claim 6, wherein said free variable p is a power of 2.

8. The circuit of claim 7, wherein in comparing said search key with a data item having the table index h(w) of said address table, a boolean variable r is initially set to true and, i=1 to k, setting r=(r and ($w_i = T_i(h)$)), so that the final value of the boolean value r is true if the search key w is stored at position h in the address table T, and the search key w does not appear at another location in said address table.

9. The circuit of claim 8, wherein said address table and said hashing function table are stored in a common memory.

10. The circuit of claim 7, wherein said address table and said hashing function table are stored in a common memory.

* * * * *